Patented Mar. 14, 1939

2,150,145

UNITED STATES PATENT OFFICE 2,150,145

PROCESS OF SMELTING METALS FROM ORES

Julian Miles Avery, Greenwich, Conn., assignor to Electro Metallurgical Company, a corporation of West Virginia No Drawing. Application February 11, 1935, Serial No. 6,097

5 Claims. (Cl. 75—11)

This invention relates especially to an improved process for smelting manganese-bearing ores, and has for its principal object the provision of a process whereby low grade manganese-bearing ores may be smelted economically with the simultaneous production in a single smelting step of high quality pig iron of novel composition and a rich manganese slag suitable for conversion into high quality manganese alloys.

Pig iron, within the terms of this invention, and as used hereinafter, is understood to mean crude unrefined iron containing over 2.5% of carbon, produced by smelting ferruginous ores with carbonaceous reducing agent, the crude iron not containing over about 5% of any single alloying agent, such as manganese.

There are in the world large deposits of manganese-bearing ores which by reason of a high ratio of iron to manganese, or a high ratio of phosphorus to manganese, or a high silica content, or combinations thereof, can neither be smelted directly nor treated in a commercially profitable manner by any known process to yield the high quality manganese alloys required by the steel industry. The problem of treating such ores by smelting methods is essentially one of selectively reducing iron or phosphorus, or both, with respect to manganese, to produce a slag sufficiently rich in manganese, and poor in iron and phosphorus, so that it can be economically smelted to produce commercial grades of ferromanganese, silico-manganese, or the like.

It has been proposed to accomplish these objects by mixing such ores with a controlled proportion of reducing agent such as coal or coke, and heating the mixture to a temperature of about 1250° to 1300° C. in an externally fired crucible. With certain ores this treatment produces an excellent separation of iron and manganese, but it is not economically practicable.

Another process, developed on a laboratory scale, contemplated the selective reduction of iron and phosphorus from low grade manganese ores by smelting in an electric furnace of the submerged arc resistance type. But the metal produced invariably contained over 10% of manganese, and as it also contained most of the phosphorus of the ores smelted, the metallic product was marketable neither as pig iron nor as a manganese alloy. The process has never been developed commercially, presumably for this reason.

More recently it has been proposed to smelt ores with a high ratio of iron and phosphorus to manganese in a blast furnace to produce a high phosphorus iron-manganese alloy containing most of the iron, manganese, and phosphorus of the ore charged. This alloy is then treated in an open hearth or electric arc furnace under an oxidizing slag to oxidize the manganese selectively out of the metal, thus producing as products of the two step process a semi-refined iron, high in phosphorus, and a rich manganese slag low in phosphorus and iron. But such a process is not economical in normal times and is looked upon as an emergency measure for the production of manganese alloys when rich natural ores are not available.

I have found by experimentation that if ores of the type in question are smelted in an electric furnace of the submerged arc-resistance type, it is not possible to attain the required degree of selective reduction if the power density used is substantially greater than a certain maximum which is characteristic of the proportions of the furnace used and of smelting conditions within the furnace. But I have further discovered that if a power density of less than this critical value is used, it is possible to attain the required degree of selective reduction, provided other necessary conditions are also met. For most conditions the critical power density appears to be about three horsepower per square inch, measured in terms of the active cross section of the electrodes employed.

The further conditions which must be met include:

1. Use of a charge containing enough manganese to flux as slag substantially all of the silica of the charge and enough silica and alumina to form a low melting point slag with substantially all of the manganese of the charge. In more precise terms, the charge should contain at least one part and not more than 2.6 parts of manganese oxide to each part of silica.

2. The charge should contain approximately that proportion of carbonaceous reducing agent which is required to reduce to metallic iron substantially all of the iron oxide of the charge.

3. The charge should contain at least 15% of iron oxide by weight, in order that the charge may contain sufficient reducing agent to be electrically conductive without destroying the selectivity of the reaction.

4. It is desirable that the electrodes used have a relatively high ratio of perimeter to cross section.

Under such conditions a very high degree of selectivity in the reduction of both iron and phosphorus with respect to manganese is obtained.

It will be obvious that the ore part of the charge may comprise manganese ore, ferruginous manganese ore, manganiferous iron ore, or iron ore, or mixtures thereof, in such proportions as to meet the requirements hereinbefore mentioned. Fluxes such as limestone, dolomite, fluorspar, bauxite, clay, quartzite, or the like, may also be added, but I prefer to use such fluxes sparingly and to supply the necessary slag ingredients by a judicious mixing of ores. In this manner it is possible to use a high silica ore to flux the manganese content of a low silica ore, and vice versa, and this is one of the advantages of the process of the invention. I prefer especially to avoid the use of considerable quantities of basic flux such as lime, and a proper limit for this flux may be set at not more than about 25% by weight of the slag formed.

Metallic iron, such as scrap steel, may be added to the charge in any desired quantity without departing from the spirit of the invention.

In order that manganese may be profitably recovered from the slag produced, it is necessary that the slag shall contain at least 20% of manganese, and this is an essential requirement of the process of the invention. It is in fact this requirement which makes the simultaneous production of pig iron containing less than 5% of manganese so difficult.

This high content of manganese in the slag has an important effect upon the pig iron produced, for it induces very strong desulphurizing action in spite of the relatively weak reducing conditions under which the iron is smelted, and it serves to refine most of the silicon out of the metal without seriously affecting its carbon content. Thus the pig iron produced has normal carbon content, is remarkably low in both silicon and sulphur, has a very low silicon content for a given sulphur content, and may also be very low in phosphorus if low phosphorus ores are used.

Heretofore processes for manufacturing pig iron in electric furnaces have been commercially successful only where the unusual combination of cheap electric power, high cost fuel, and cheap labor prevails, hence electric pig iron is manufactured only in small quantities and in relatively isolated parts of the world. It is an object of the invention to provide a process whereby pig iron may be manufactured commercially in electric furnaces in localities where it could not otherwise be so produced.

Low sulphur pig iron is greatly desired for both steel making and foundry melting. For some purposes a pig iron simultaneously low in sulphur and relatively low in silicon is desired and is provided at high cost by smelting iron ore in blast furnaces using charcoal as fuel instead of coke. In such irons a substantial proportion of manganese is sometimes desired, but it is to be noted that as the manganese content of such pig irons increases the silicon content also increases, and conversely. Hence, there is no pig iron commercially available which is simultaneously very low in silicon and sulphur, and relatively high in manganese.

There is also in the steel and foundry industries a demand for iron containing the carbon content of pig iron, but practically free of sulphur, silicon, and phosphorus. Such a metal, known as "washed metal" has been produced by refining pig iron successively under oxidizing and reducing slags. In this process any manganese contained in the original pig iron is necessarily lost, although a substantial content of manganese would frequently be desirable in the washed metal.

Thus the pig iron of the invention is unique in composition, fills a need in the ferrous industries, and serves the very important function of making the process of the invention commercially profitable. On the other hand, the process of the invention, by producing a slag of relatively high value, makes it possible to manufacture special grades of pig iron in electric furnaces on a commercially profitable basis, even in localities where pig iron could not otherwise be produced economically by electric smelting.

The following examples will serve to make clear the process of the invention.

In an electric furnace of the submerged arc-resistance type rated at 5000 horsepower normal load and equipped with one 35-inch round electrode, the following data were obtained during a ten day test.

Typical charge smelted:
Iron ore—100 parts by weight (approximately).
Manganese ore—20 parts by weight (approximately).
Coke—20 parts by weight (approximately).

The pig iron produced had the composition:

| Element | Range | Typical |
|---|---|---|
| | Percent | Percent |
| Silicon | 0.10 to 0.40 | 0.20 |
| Sulphur | 0.05 to 0.005 | 0.03 |
| Phosphorus | 0.01 to 0.06 | 0.03 |
| Carbon | 3.00 to 4.25 | 3.9 |
| Manganese | 0.50 to 5.00 | 2.50 |
| Iron | Balance. | |

The slag produced had the typical composition:

| | Per cent |
|---|---|
| MnO | 53 |
| SiO$_2$ | 30 |
| FeO | 6 |
| Al$_2$O$_3$ | 8 |
| CaO | 3 |

The iron ore used was high grade low phosphorus magnetite, and the manganese ore used was an ordinary commercial ferromanganese ore.

It was found that adequate control of the composition of the metal and slag could be obtained by means hereinbefore set forth. The manganese content of the metal could be increased by increasing the coke or coal ratio in the charge, or by increasing the power, or by adding limestone to the charge. It was not difficult to hold the manganese content of the pig iron below 5% if the power used was less than about 3000 horsepower, but impossible to do so when using about 5000 horsepower. Conversely, if the reduction was not as complete as desired, conditions were readily remedied, for example by increasing the proportion of reducing agent in the charge.

Following is an example of the application of the process of typical low grade ores of United States:

| Ore | A | B |
|---|---|---|
| Mn | 29 | 24 |
| Fe | 24 | 1.5 |
| SiO$_2$ | 5 | 38 |
| CaO | 2 | --- |
| Al$_2$O$_3$ | 4 | --- |
| P | 0.2 | 0.4 |

Typical charge:
Ore A—100 parts by weight (approximately).
Ore B—60 parts by weight (approximately).
Coke—7 parts by weight (approximately).

Typical analysis of pig iron produced:
Mn ---------------------------------- 2.5%
Fe ---------------------------------- Balance.
Si ---------------------------------- 0.2%
P ----------------------------------- 1.9%
C ----------------------------------- 4.0%
S ----------------------------------- 0.03%

Typical analysis of slag produced:
|  | Per cent |
|---|---|
| MnO | 57 |
| FeO | 5 |
| $SiO_2$ | 31 |
| CaO | 2 |
| $Al_2O_3$ | 4 |
| P | 0.13 |

A typical manganiferous iron ore might be treated as follows.

Analysis of ore:
|  | Per cent |
|---|---|
| Mn | 9.5 |
| Fe | 44 |
| $SiO_2$ | 6 |
| $Al_2O_3$ | 4 |
| P | 0.25 |

Typical charge:
Ore—100 parts by weight (approximately).
Coke—10 parts by weight (approximately).
Coal—12 parts by weight (approximately).

Typical analysis of pig iron made:
Mn ---------------------------------- 2.5%
C ----------------------------------- 4.0%
Si ---------------------------------- 0.2%
S ----------------------------------- 0.03%
P ----------------------------------- 0.6%
Fe ---------------------------------- Balance.

Typical analysis of slag made:
|  | Per cent |
|---|---|
| MnO | 50 |
| FeO | 5 |
| $SiO_2$ | 27 |
| $Al_2O_3$ | 18 |

By the expression "electric furnace of the submerged arc-resistance type" as used herein, is meant an electric furnace wherein the electrode is so arranged that the arc thereof is submerged under the charge and part of the heat is developed by the resistance offered to the current by a part of the charge (i. e., a bed of coke under the electrode).

While I have described a preferred embodiment of my invention, many modifications may be made without departing from the spirit of the invention, and I do not wish to be limited to the precise details of construction and operation set forth, but desire to avail myself of all changes within the scope of the appended claims.

Having thus described my invention, what I claim as new and desire to secure by Letters Patent of the United States, is:

1. Process for treating manganese-bearing and ferruginous ores for the simultaneous production in a single smelting step of a useful grade of pig iron and a rich manganese slag, which process comprises smelting in an electric furnace of the submerged arc-resistance type a charge containing oxides of iron and manganese carbonaceous reducing agent in approximately that proportion which is required to reduce to metallic iron substantially all of the iron oxide contained in the charge, said charge further containing at least fifteen per cent by weight of iron oxide, and manganese in the ratio of at least one part and not more than 2.6 parts of manganese oxide to each part of silica, said process being further characterized by the fact that the power density used in the furnace is less than about three horsepower per square inch of active electrode area.

2. Process for treating manganese-bearing and ferruginous ores for the simultaneous production in a single smelting step of a useful grade of pig iron and a rich manganese slag, which process comprises smelting in an electric furnace of the submerged arc-resistance type a charge containing oxides of iron and manganese, carbonaceous reducing agent in approximately that proportion which is required to reduce to metallic iron substantially all of the iron oxide contained in the charge, said charge further containing at least fifteen per cent by weight of iron oxide, and manganese in the ratio of at least one part and not more than 2.6 parts of manganese oxide to each part of silica.

3. The herein described process for the simultaneous production in a single smelting step, of pig iron containing less than five per cent of manganese and a slag containing more than twenty per cent of manganese, which process comprises smelting in an electric furnace of the submerged arc-resistance type a charge containing a mixture of manganese and iron oxides and silica together with sufficient carbonaceous reducing agent to reduce to metallic iron substantially all of the iron oxide contained in the charge, said charge containing at least one part and not more than 2.6 parts of manganese oxide to each part of silica.

4. Process for substantially separating iron and phosphorus from manganese, which process comprises smelting in an electric furnace of the submerged arc-resistance type a charge containing manganese-bearing and ferruginous ores including silica together with sufficient carbonaceous reducing agent to reduce to metallic iron substantially all of the iron oxide contained in the charge, said charge containing at least one part and not more than 2.6 parts of manganese oxide to each part of silica.

5. A process of producing pig iron with a low ratio of silicon to sulphur for a given sulphur content, and of silicon to manganese, which process comprises charging a submerged arc-resistance type of electric furnace with a mixture of iron and manganese oxides, silica and carbonaceous reducing agent in an amount sufficient to reduce to metallic iron substantially all of the iron oxide contained in the charge, and electrically smelting the charge using a power density in the furnace less than about three horsepower per square inch of electrode area, said charge containing at least one part and not more than 2.6 parts of manganese oxide to each part of silica.

JULIAN M. AVERY.